United States Patent
Kim et al.

(10) Patent No.: US 10,893,478 B2
(45) Date of Patent: Jan. 12, 2021

(54) MULTI-SIM DEVICE FOR PERFORMING SCHEDULING FOR BASE STATION SEARCHER AND METHOD OF SCHEDULING BASE STATION SEARCH

(71) Applicant: SAMSUNG ELECTRONICS CO., LTD., Suwon-si (KR)

(72) Inventors: Sang-tae Kim, Suwon-si (KR); Jeong-gyun Yu, Suwon-si (KR); Jun-kyoung Lee, Yongin-si (KR); Sang-bong Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/559,794

(22) Filed: Sep. 4, 2019

(65) Prior Publication Data
US 2020/0128481 A1    Apr. 23, 2020

(30) Foreign Application Priority Data
Oct. 22, 2018    (KR) .................. 10-2018-0126313

(51) Int. Cl.
*H04W 52/02*    (2009.01)
*H04W 56/00*    (2009.01)
*H04W 48/14*    (2009.01)
*H04W 88/06*    (2009.01)

(52) U.S. Cl.
CPC ......... *H04W 52/028* (2013.01); *H04W 48/14* (2013.01); *H04W 56/001* (2013.01); *H04W 88/06* (2013.01)

(58) Field of Classification Search
CPC ..... H04W 88/06; H04W 24/10; H04W 76/15; H04W 76/27; H04W 56/001; H04W 72/14; H04W 28/06; H04W 72/044; H04W 76/28; H04W 8/08; H04W 28/0205; H04W 36/0066; H04W 56/00; H04W 12/00403; H04W 28/0236; H04W 28/0268; H04W 36/0085; H04W 36/0088; H04W 4/20; H04W 68/02; H04W 72/1215; H04W 76/16; H04W 52/028; H04W 48/14
See application file for complete search history.

(56) References Cited

U.S. PATENT DOCUMENTS

| | | |
|---|---|---|
| 8,204,516 B2 | 6/2012 | Hsu |
| 8,934,460 B1 | 1/2015 | Hu et al. |
| 9,294,141 B2 | 3/2016 | Challa et al. |
| 9,451,614 B2 | 9/2016 | Krishnamurthy |
| 9,480,040 B2 | 10/2016 | Cherry et al. |
| 9,661,674 B2 | 5/2017 | Su |

(Continued)

*Primary Examiner* — Daniel Lai
(74) *Attorney, Agent, or Firm* — Sughrue Mion, PLLC

(57) ABSTRACT

A multi-subscriber identification module (SIM) device is provided. The multi-SIM device includes a first SIM interface; a second SIM interface; and at least one processor configured to implement: a base station (BS) searcher configured to perform a resynchronization operation for securing synchronization with a BS or a measurement operation for measuring signal quality of the BS based on a request received from the first SIM interface; and a searcher scheduler configured to receive the request for use of the BS searcher from the first SIM interface, and identify whether the first SIM interface is granted use of the BS searcher based on the request and a schedule for the BS searcher.

20 Claims, 13 Drawing Sheets

(56) References Cited

U.S. PATENT DOCUMENTS

| | | |
|---|---|---|
| 9,674,775 B2 | 6/2017 | Barakam et al. |
| 9,699,606 B1* | 7/2017 | Bhatia ................ G06Q 30/0261 |
| 2012/0057525 A1* | 3/2012 | Hou .................. H04W 72/1215 |
| | | 370/328 |
| 2013/0150112 A1* | 6/2013 | Qi ..................... H04W 56/0015 |
| | | 455/515 |
| 2013/0316718 A1 | 11/2013 | Hsu et al. |
| 2014/0169347 A1* | 6/2014 | Lamazure ............ H04B 17/327 |
| | | 370/337 |
| 2015/0023230 A1 | 1/2015 | Hu et al. |
| 2016/0021942 A1 | 1/2016 | Vauge-Lalanne et al. |
| 2016/0105540 A1* | 4/2016 | Kwon ................ H04N 21/4312 |
| | | 715/747 |
| 2016/0183238 A1* | 6/2016 | Buthler ............. H04W 72/0446 |
| | | 370/329 |

* cited by examiner

MULTI-SIM DEVICE FOR PERFORMING SCHEDULING FOR BASE STATION SEARCHER AND METHOD OF SCHEDULING BASE STATION SEARCH

CROSS-REFERENCE TO THE RELATED APPLICATION

This application claims priority from Korean Patent Application No. 10-2018-0126313, filed on Oct. 22, 2018 in the Korean Intellectual Property Office, the disclosure of which is incorporated by reference herein in its entirety.

BACKGROUND

Apparatuses and methods consistent with example embodiments relate to a multi-subscriber identification module (SIM) device that searches for a base station (BS) using a BS searcher and a method of scheduling a BS search.

A multi-SIM device, such as a mobile phone, a personal digital assistant (PDA), a tablet personal computer (PC), or a laptop PC, may include two or more SIMs. A SIM may include a SIM interface and a SIM card. A SIM card may be inserted into a SIM interface. A SIM may also be an embedded SIM in which the SIM is permanently embedded in the multi-SIM device and may be programmable. Each of the SIMs may include international mobile subscriber identity (IMSI) information and key information by which a user of the multi-SIM device may be checked and authenticated by a service provider. In the multi-SIM device, the user may access various networks by using a plurality of SIMs. For example, a first SIM may access a first network and a second SIM may access a second network.

When the multi-SIM device is a dual SIM dual standby (DSDS) device, one RF resource is shared by the plurality of SIMs. In the case in which RF resource use request periods of the SIMs overlap, due to a SIM that does not receive the RF resource, communication performance of the multi-SIM device deteriorates. In addition, when the multi-SIM device is a dual SIM dual active (DSDA) device, a plurality of RF resources are respectively allotted to the SIMs. Thus, better communication performance may be provided than when the multi-SIM device is the DSDS device. However, because required hardware or software specifications are large, expenses for mass-producing the multi-SIM device and the amount of power consumption of the multi-SIM device may remarkably increase.

In particular, in the multi-SIM device, a BS searcher for searching for BSs is used for communication with the BSs. Because one BS searcher is shared by the plurality of SIMs, BS searcher use request periods of the SIMs overlap.

SUMMARY

One or more example embodiments a multi-SIM device capable of performing scheduling for a base station (BS) searcher and accordingly, a plurality of SIMs may efficiently perform BS search operations and a method of scheduling a BS search.

According to an aspect of an example embodiment, there is provided a multi-SIM device including a first SIM interface; a second SIM interface; and at least one processor configured to implement: a BS searcher configured to perform a resynchronization operation for securing synchronization with a BS or a measurement operation for measuring signal quality of the BS based on a request received from the first SIM interface; and a searcher scheduler configured to receive the request for use of the BS searcher from the first SIM interface, and identify whether the first SIM interface is granted use of the BS searcher based on the request and a schedule for the BS searcher.

According to an aspect of an example embodiment, there is provided a method of scheduling an operation of a BS searcher configured to perform a resynchronization operation for securing synchronization with a BS or a measurement operation for measuring signal quality of the BS based on a request received from a first SIM interface or a second SIM interface, the method including: receiving a measurement grant request for the BS searcher from the first SIM interface; and outputting to the first SIM interface, based on a status of the BS searcher, one from among a wait signal for having the first SIM interface wait for the measurement operation or a grant signal for having the first SIM interface perform the measurement operation.

According to an aspect of an example embodiment, there is provided a method of managing a wake-up time at which a BS searcher starts a resynchronization operation in accordance with a resynchronization operation request for securing synchronization with a first BS corresponding to a first SIM interface and a second BS corresponding to a second SIM interface, the method including: identifying whether a first resynchronization operation corresponding to the first SIM interface temporally overlaps with a second resynchronization operation corresponding to the second SIM interface; and controlling a wake-up time of the first SIM interface based on a result of the identifying whether the first resynchronization operation and the second resynchronization operation temporally overlap.

BRIEF DESCRIPTION OF THE DRAWINGS

The above and other aspects, features and advantages will become apparent from the following detailed description taken in conjunction with the accompanying drawings in which.

DETAILED DESCRIPTION

Figure 1:
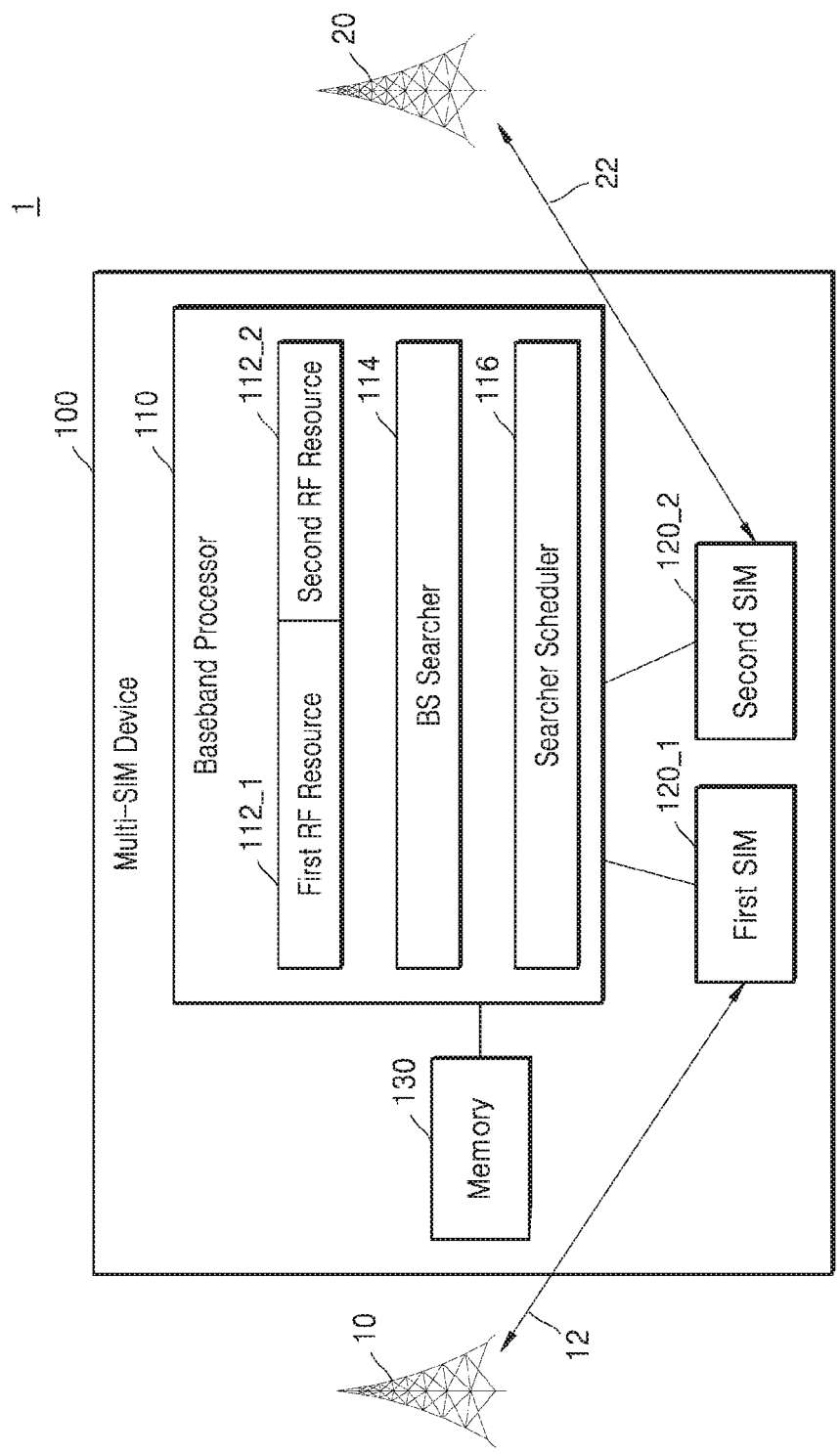
FIG. 1 is a view illustrating a wireless communication system according to an example embodiment.

FIG. 1 is a view illustrating a wireless communication system 1 according to an example embodiment.

Referring to FIG. 1, the wireless communication system 1 may include a multi-subscriber identification module (SIM) device 100 and a first base station (BS) 10 and a second BS 20. The wireless communication system 1 may include, as a non-limiting example, a fifth generation wireless (5G) system, a long term evolution (LTE) system, a code division multiple access (CDMA) system, a wideband code division multiple access (WCDMA) system, a global system for mobile communications (GSM) system, a wireless local area network (WLAN) system, or another arbitrary wireless communication system.

Each of the first BS 10 and the second BS 20 communicates with a terminal and allots communication network resources to the terminal, and may include at least one of a cell, a NodeB (NB), an eNodeB (eNB), a next generator radio access network (NG RAN), a wireless access unit, a BS controller, and a node on a network.

The multi-SIM device 100 communicates with a BS or another multi-SIM device, and may be referred to as a node, user equipment (UE), a next generation UE (NG UE), a mobile station (MS), mobile equipment (ME), a device, or a terminal.

In addition, the multi-SIM device 100 may include at least one of a smart phone, a tablet PC, a mobile telephone, an image telephone, an electronic book reader, a desktop PC, a laptop PC, a netbook computer, a personal digital assistant (PDA), a portable multimedia player (PMP), an MP3 player, a medical device, a camera, and a wearable device. In addition, the multi-SIM device 100 may include at least one of a television, a digital video disk (DVD) player, an audio system, a refrigerator, an air conditioner, a vacuum cleaner, an oven, a microwave oven, a washing machine, an air cleaner, a set top box, a home automation control panel, a security control panel, a media box (for example, Samsung HomeSync™, Apple TV™, or Google TV™), a game console (for example, Xbox™ or PlayStation™), an electronic dictionary, an electronic key, a camcorder, and an electronic frame.

In addition, the multi-SIM device 100 may include at least one of various medical devices, for example, various portable medical measuring devices such as a glucometer, a heart rate meter, a blood pressure meter, and a temperature detector, a magnetic resonance angiography (MRA) machine, a magnetic resonance imaging (MRI) machine, a computed tomography (CT) scanning machine, and an ultrasonic machine, a navigation device, a global navigation satellite system (GNSS), an event data recorder (EDR), a flight data recorder (FDR), a vehicle infotainment device, electronic equipment for ships, for example, a navigation device for ships or a gyro compass, avionics, a security device, a head unit for a vehicle, an industrial or home robot, a drone, an automated teller machine (ATM) of a financial institution, point of sales (POS) of a store, and an Internet of Things (IoT) device, for example, a light bulb, various sensors, a sprinkler device, a fire alarm, a temperature controller, a streetlight, a toaster, fitness equipment, a hot water tank, a heater, or a boiler. The multi-SIM device 100 may include various kinds of multimedia systems capable of performing communication functions.

The multi-SIM device 100 may be connected to prescribed wireless communication networks through the first BS 10 and the second BS 20. Information may be transmitted from the wireless communication networks by one of various multi-access methods such as code division multiple access (CDMA), WCDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA.

At this time, the multi-SIM device 100 and the first BS 10 and the second BS 20 may communicate with each other and may transmit and receive a signal (or data) through various channels. In the current specification, transmitting and receiving a signal (or data) through a channel may be expressed as transmitting and receiving a channel. Additionally, a baseband processor 110 communicating with the first BS 10 and the second BS 20 by using a first SIM 120_1 and a second SIM 120_2 may be expressed as the first SIM 120_1 and the second SIM 120_2 communicating with the first BS 10 and the second BS 20.

The multi-SIM device 100 may include the baseband processor 110, the first SIM 120_1, the second SIM 120_2, a memory 130 and a transceiver (transmitter and receiver). The multi-SIM device 100 may use a first network service by connecting to a first network through the first BS 10 using the first SIM 120_1. The multi-SIM device 100 may use a second network service by connecting to a second network through the second BS 20 using the second SIM 120_2.

The baseband processor 110 may include a first radio frequency (RF) resource 112_1, a second RF resource 112_2, a BS searcher 114, and a searcher scheduler 116. The first RF resource 112_1 and the second RF resource 112_2 may include circuits and paths for receiving channels from the first BS 10 and the second BS 20 or tangible or intangible resources for processing transmitting/receiving channels.

The first RF resource 112_1 may support non-restrictive channel configuration use in accordance with a radio resource control (RRC) protocol, and the second RF resource 112_2 may support restrictive channel configuration use in accordance with the RRC protocol. In detail, the first RF resource 112_1 may support processing on a channel required for a prescribed SIM to maintain a network connection mode and a channel required in an idle mode, and the second RF resource 112_2 may support only processing on a channel required by a prescribed SIM in the idle mode. In addition, the channel required by the SIM in the idle mode may have a periodic characteristic and may include scheduling information that informs transmission timing of the channel.

For example, when the wireless communication system 1 is a WCDMA system, the channels required for the SIM to maintain the network connection mode are a dedicated channel (DCH), a forward access channel (FACH), a random access channel (RACH), a broadcast channel (BCH), and a paging channel (PCH) and the channels required by the SIM in the idle mode may be defined as the BCH and the PCH.

As described above, because the first RF resource 112_1 supports processing on more kinds of channels than the second RF resource 112_2, a configuration of the first RF resource 112_1 may be different from a configuration of the second RF resource 112_2. In detail, the complexity of the configuration of the first RF resource 112_1 may be higher than the complexity of the configuration of the second RF resource 112_2.

The first SIM 120_1 may receive at least one first channel 12 required to use the first network service from the first BS 10. The second SIM 120_2 may receive at least one second channel 22 required to use the second network service from the second BS 20. At this time, the first SIM 120_1 and the second SIM 120_2 require RF resources in order to process the first channel 12 and the second channel 22. At this time, the baseband processor 110 may selectively allot one of the first RF resource 112_1 and the second RF resource 112_2 to the first SIM 120_1 and the second SIM 120_2 based on information on the first network and the second network.

In an example embodiment, the multi-SIM device 100 may operate in a dual radio (DR) mode or a dual SIM dual standby (DSDS) mode when the resources are allotted. In the DR mode, the first RF resource 112_1 and the second RF resource 112_2 are respectively allotted to the first SIM 120_1 and the second SIM 120_2 and communication operations are performed by using all the first RF resource 112_1 and the second RF resource 112_2. The baseband processor 110 may determine whether the multi-SIM device 100 may operate in the DR mode based on the information on the first network and the second network.

The baseband processor 110 sets one of the first SIM 120_1 and the second SIM 120_2 as a main SIM and sets the other one as a sub-SIM and then, may allot the main SIM to the first RF resource 112_1 and allot the sub-SIM to the second RF resource 112_2 when it is determined that the multi-SIM device 100 may operate in the DR mode.

In an example embodiment, when the first SIM 120_1 is set as the main SIM and the second SIM 120_2 is set as the sub-SIM, the first SIM 120_1 processes the first channel 12 received from the first BS 10 by using the first RF resource 112_1 and may perform an operation in a connection mode with the first network or perform an operation in the idle mode. The second SIM 120_2 processes the second channel 22 received from the second BS 20 by using the second RF resource 112_2 and may perform an operation in the idle mode.

The operation in the connection mode may include an operation of actively exchanging data, for example, voice or data calls or sessions with at least one BS in the wireless communication system 1. The operation in the idle mode may include an operation of monitoring the channel, for example, the PCH or the BCH having the periodic characteristic.

When RF resource use request periods of the first SIM 120_1 and the second SIM 120_2 overlap, the multi-SIM device 100 operates in the DR mode, allots the first RF resource 112_1 to the first SIM 120_1 and the second RF resource 112_2 to the second SIM 120_2 and then, may perform the communication operation through the first SIM 120_1 and the second SIM 120_2. The baseband processor 110 allots the first RF resource 112_1 to one of the first SIM 120_1 and the second SIM 120_2 and accordingly, the multi-SIM device 100 operates in the DSDS mode when it is determined that the multi-SIM device 100 may not operate in the DR mode.

The information on the first network and the information, on the second network based on which it is determined whether the DR mode is accessible and the main SIM and the sub-SIM are set, may include at least one information on the first channel 12 required between the first network and the first SIM 120_1 and at least one information on the second channel 22 required between the second network and the second SIM 120_2. That is, the information on the first channel 12 may include first channel set information that represents a kind of the first channel 12 and first scheduling information on the first channel 12 when the first channel 12 has the periodic characteristic. In addition, the information on the second channel 22 may include second channel set information that represents a kind of the second channel 22 and second scheduling information on the second channel 22 when the second channel 22 has the periodic characteristic.

The BS searcher 114 secures synchronization with the first BS 10 and the second BS 20 in accordance with a request of the first SIM 120_1 or the second SIM 120_2. The BS searcher 114 may perform a resynchronization operation for receiving paging from the first BS 10 and the second BS 20 or a measurement operation for measuring signal quality of the neighboring first BS 10 and the second BS 20 for hand-over. In an example embodiment, the BS searcher 114 may be formed of hardware.

The searcher scheduler 116 may manage a request schedule for the BS searcher 114 of the first SIM 120_1 and the second SIM 120_2. In an example embodiment, when the resynchronization operation or the measurement operation is to be performed by using the BS searcher 114, the first SIM 120_1 and the second SIM 120_2 may output a use request signal to the searcher scheduler 116 and the searcher scheduler 116 may output a grant signal or a wait signal to the first SIM 120_1 and the second SIM 120_2 based on the request schedule for the BS searcher 114. In an example embodiment, the searcher scheduler 116 may manage the request schedule for the BS searcher 114 based on at least one of whether the BS searcher 114 operates, the operations performed by the first SIM 120_1 and the second SIM 120_2, and current statuses of the first SIM 120_1 and the second SIM 120_2.

The searcher scheduler 116 manages the request schedule for the BS searcher 114, may determine whether the plurality of SIMs, for example, the first SIM 120_1 and the second SIM 120_2, use the BS searcher 114 based on the request schedule, and may efficiently perform the resynchronization operation or the measurement operation by using the BS searcher 114. In addition, the multi-SIM device 100 operates the plurality of SIMs, for example, the first SIM 120_1 and the second SIM 120_2, only by the BS searcher 114 and accordingly, a required area may be reduced.

In the current specification, it is described that the BS searcher 114 performs the resynchronization operation or the measurement operation in accordance with the request of the plurality of SIMs. For example, the first SIM 120_1 and the second SIM 120_2, perform the resynchronization operations or the measurement operations.

The memory 130 may store the information on the first network and the information on the second network and, whenever the information on the first network and the information on the second network are updated, may store the updated information. The baseband processor 110 accesses the memory 130, reads the information on the first network and the information on the second network, and may perform an operation according to the example embodiments. In addition, the memory 130 may store information on wake-up time at which the resynchronization operation is performed, as described with reference to FIG. 9.

In FIG. 1, it is illustrated that the multi-SIM device 100 includes only the two SIMs, that is, the first SIM 120_1 and the second SIM 120_2, and the baseband processor 110 includes only the two RF resources, that is, the first RF resource 112_1 and the second RF resource 112_2. However, the multi-SIM device 100 may include more SIMs and more RF resources. The example embodiments described hereinafter may be applied to a multi-SIM device including three or more SIMs or three or more RF resources.

Figure 2:
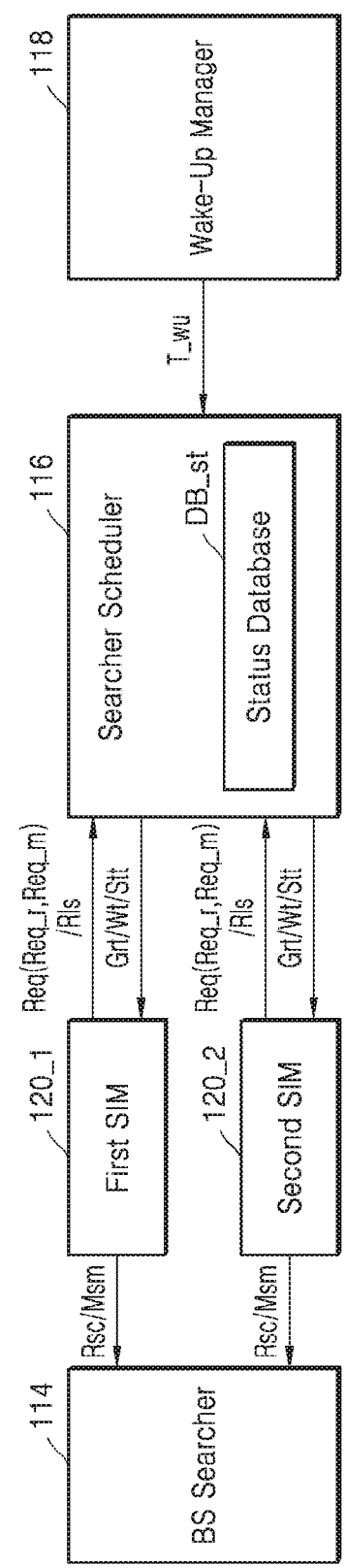
FIG. 2 is a block diagram illustrating a multi-subscriber identification module (SIM) device according to an example embodiment.

FIG. 2 is a block diagram illustrating a multi-SIM device according to an example embodiment. Descriptions already given with reference to FIG. 1 are omitted.

Referring to FIG. 2, the multi-SIM device 100 may include the first SIM 120_1, the second SIM 120_2, the BS searcher 114, the searcher scheduler 116, and a wake-up manager 118.

In order to perform the resynchronization operation or the measurement operation, the first SIM 120_1 and the second SIM 120_2 may output a use request Req to the searcher scheduler 116. The use request Req may include a resynchronization grant request Req_r for performing the resynchronization operation and a measurement grant signal Req_m for performing the measurement operation. The searcher scheduler 116 may transmit one of the grant signal Grt, the wait signal Wt, and a start signal Stt in response to the use request Req of the first SIM 120_1 or the second SIM 120_2.

The first SIM 120_1 and the second SIM 120_2 may perform the resynchronization operations or the measurement operations when the grant signal Grt is received and may perform the resynchronization operations or the measurement operations when the wait signal Wt is received after the start signal Stt is received. When the resynchronization operations or the measurement operations are completed, the first SIM 120_1 and the second SIM 120_2 may output a release signal R1s that represents that the resynchronization operations or the measurement operations are completed to the searcher scheduler 116. In FIG. 2, the grant signal Grt and the start signal Stt are illustrated as separate signals. However, the grant signal Grt and the start signal Stt may be formed of a signal, for example, '1' having the same information.

The searcher scheduler 116 may include a status database DB_st including information on whether the BS searcher 114 is used. The searcher scheduler 116 may determine whether the BS searcher 114 is used through the status database DB_st in response to a measurement grant request Req_m of the first SIM 120_1 or the second SIM 120_2. In an example embodiment, the searcher scheduler 116 may determine whether to allow the first SIM 120_1 or the second SIM 120_2 to use the BS searcher 114 based on whether the BS searcher 114 is in use, as described in detail with reference to FIG. 3.

The wake-up manager 118 may store and control the wake-up time T_wu at which the first SIM 120_1 and the second SIM 120_2 start the resynchronization operations and power is applied to the first SIM 120_1 and the second SIM 120_2. The wake-up time T_wu may be previously determined and the first SIM 120_1 and the second SIM 120_2 may perform the resynchronization operations at the previously determined wake-up time T_wu. In an example, the wake-up manager 118 may receive information on the wake-up time T_wu from the memory (130 of FIG. 1).

In an example embodiment, the searcher scheduler 116 receives the wake-up time T_wu from the wake-up manager 118 in response to the measurement grant request Req_m of the first SIM 120_1 or the second SIM 120_2 and may determine whether the first SIM 120_1 or the second SIM 120_2 allows the BS searcher 114 to be used based on the received wake-up time T_wu, as described in detail with reference to FIG. 4.

The wake-up manager 118 may control the wake-up time T_wu of at least one of the first SIM 120_1 and the second SIM 120_2. In an example embodiment, when the resynchronization operations of the first SIM 120_1 and the second SIM 120_2 are simultaneously performed, the wake-up manager 118 controls the wake-up time T_wu of one of the first SIM 120_1 and the second SIM 120_2 and accordingly, the resynchronization operations of the first SIM 120_1 and the second SIM 120_2 do not overlap. This is described in more detail below with reference to FIG. 9.

Figure 3:
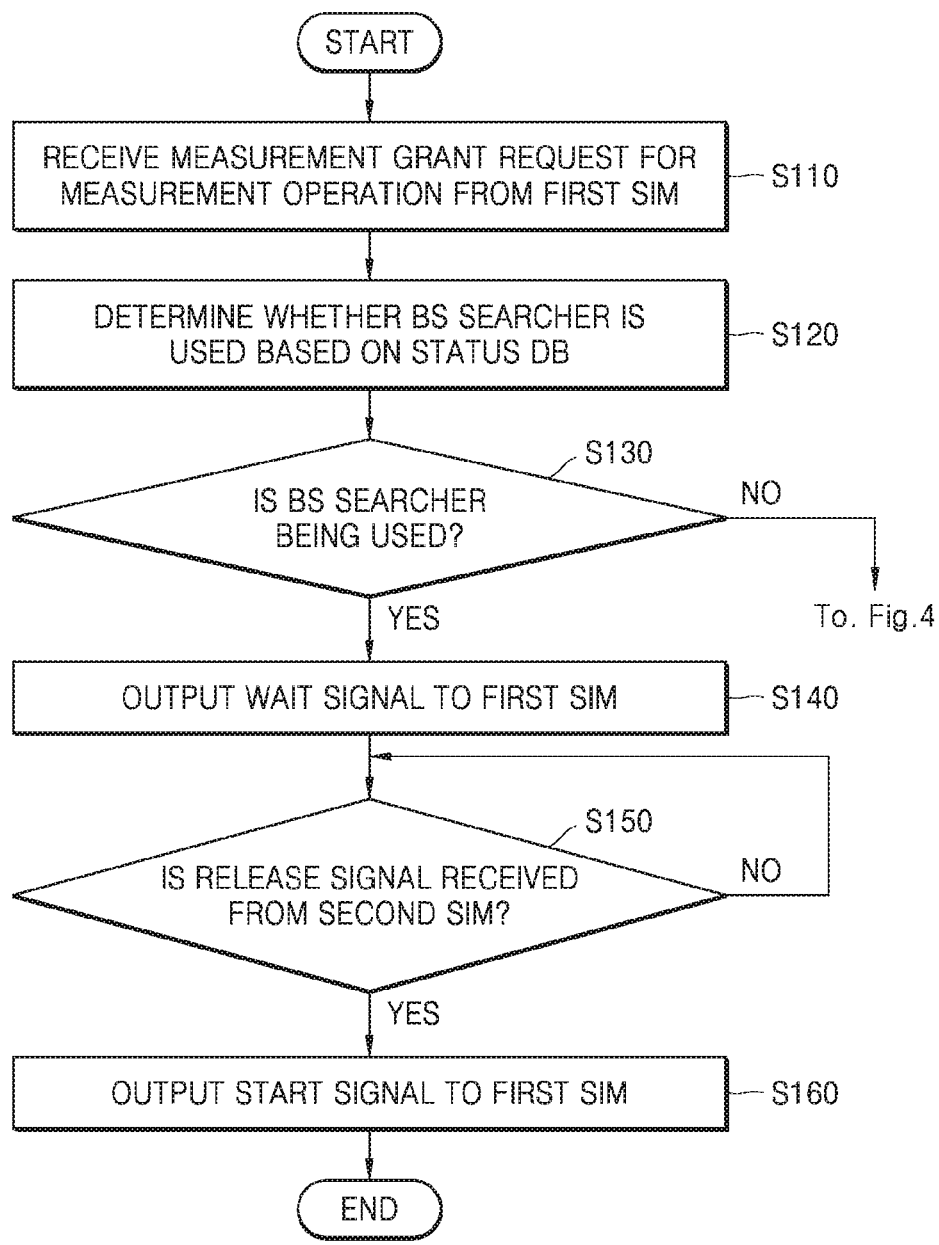
FIG. 3 is a flowchart illustrating an operation of a searcher scheduler according to an example embodiment.

FIG. 3 is a flowchart illustrating an operation of a searcher scheduler 116 according to an example embodiment. In detail, FIG. 3 is a view illustrating the operation of the searcher scheduler 116 when the measurement grant request is received from the first SIM 120_1.

Referring to FIGS. 2 and 3, when the measurement grant request Req_m is received from the first SIM 120_1 in operation S110, the searcher scheduler 116 may determine whether the BS searcher 114 is currently used based on the status database DB_st in operation S120.

When the searcher scheduler 116 determines that the BS searcher 114 is being used in operation S130, the searcher scheduler 116 may output the wait signal Wt to the first SIM 120_1 in operation S140. Then, when the second SIM 120_2 has completed use of the BS searcher 114, the searcher scheduler 116 may receive the release signal R1s that represents that the second SIM 120_2 has released the BS searcher 114 in operation S150. The searcher scheduler 116 may output the start signal Stt to the first SIM 120_1 in response to the release signal R1s in operation S160.

The first SIM 120_1 may output a measurement request Msm for performing the measurement operation to the BS searcher 114 in response to the start signal Stt. After the measurement operation is completed, the first SIM 120_1 may output the release signal R1s to the searcher scheduler 116. The searcher scheduler 116 may update the status database DB_st so as to represent that the BS searcher 114 is not currently used in response to the release signal R1s. The case in which the BS searcher 114 is not being used in operation S130 will be described later with reference to FIG. 4.

Figure 4:
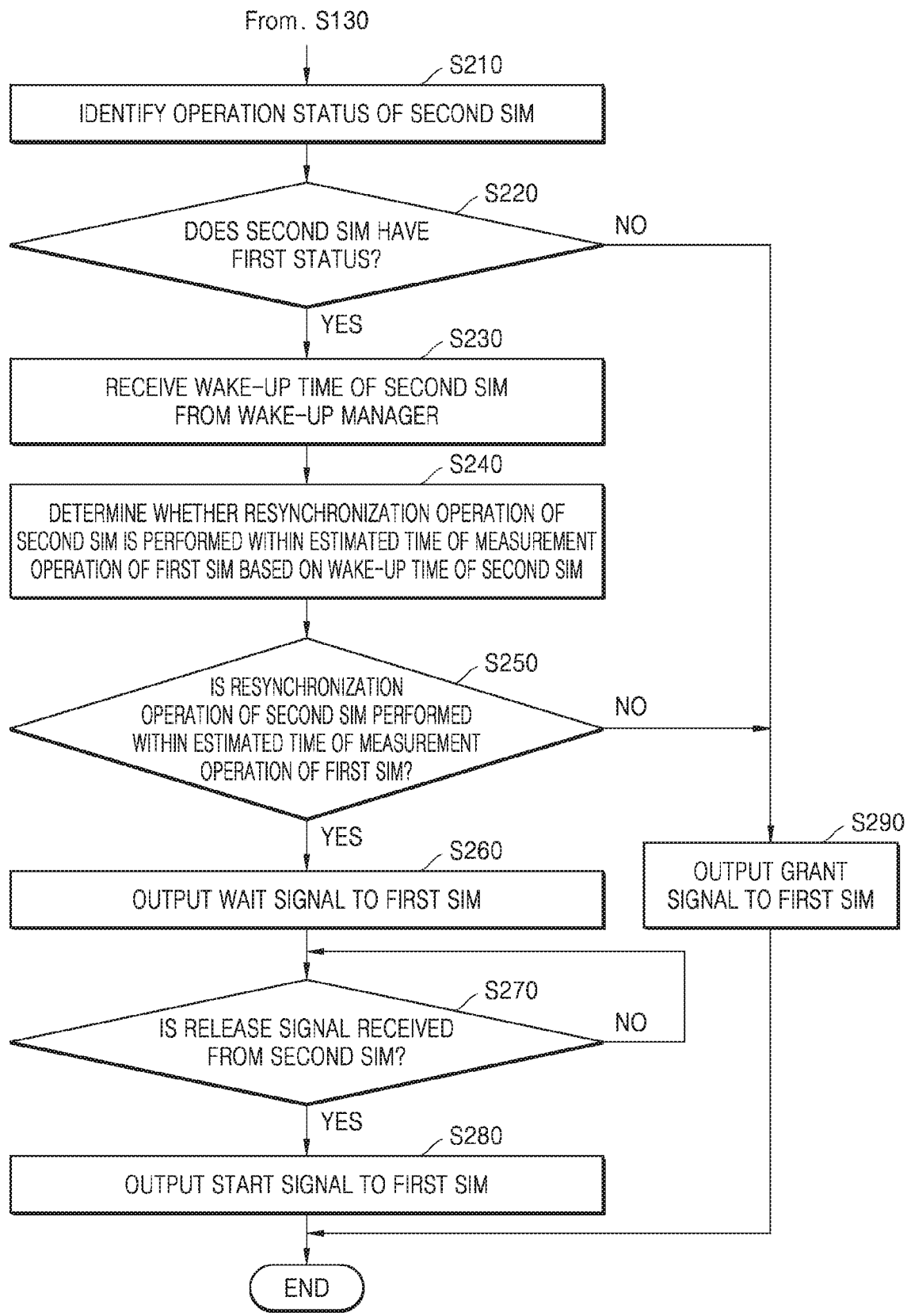
FIG. 4 is a flowchart illustrating an operation of a searcher scheduler according to an example embodiment.

FIG. 4 is a flowchart illustrating an operation of a searcher scheduler 116 according to an example embodiment. In detail, FIG. 4 is a view illustrating the operation of the searcher scheduler 116 when it is determined that the BS searcher 114 is not being used ('no' of S130 in FIG. 3).

Referring to FIGS. 2, 3 and 4, when the BS searcher 114 is not being used, the searcher scheduler 116 may identify an operation status of the second SIM 120_2 in operation S210.

The first SIM 120_1 and the second SIM 120_2 may have a first status in which paging is received from a newly connected BS or a second status in which the first SIM 120_1 and the second SIM 120_2 are connected to the BS and transmit data to and receive data from the BS. In an example embodiment, in the first status, the first SIM 120_1 and the second SIM 120_2 may be connected to the PCH and, in the second status, the first SIM 120_1 and the second SIM 120_2 may be connected to the DCH. In the current specification, the status in which the first SIM 120_1 and the second SIM 120_2 are connected to the PCH may be referred to as the first status and the status in which the first SIM 120_1 and the second SIM 120_2 are connected to the DCH may be referred to as the second status. The first SIM 120_1 and the second SIM 120_2 may perform the resynchronization operations or the measurement operations in the first status and may perform the measurement operations in the second status.

A priority of the resynchronization operation may have a higher priority than the measurement operation. When the second SIM 120_2 does not have the first status but has the second status in operation S220, because the second SIM 120_2 does not perform the resynchronization operation, which has a higher priority than the measurement operation, the searcher scheduler 116 may output the grant signal Grt to the first SIM 120_1 in operation S290.

When the second SIM 120_2 has the first status in operation S220, the searcher scheduler 116 may receive the wake-up time T_wu of the second SIM 120_2 from the wake-up manager 118 in operation S230. In addition, the searcher scheduler 116 may determine whether the resynchronization operation of the second SIM 120_2 is performed within an estimated time of the measurement operation performed by the first SIM 120_1 based on the wake-up time T_wu of the second SIM 120_2 in operation S240. In an example embodiment, the searcher scheduler 116 may determine whether the wake-up time of the second SIM 120_2 is included in the estimated time of the measurement operation of the first SIM 120_1.

When the resynchronization operation of the second SIM 120_2 is performed within the estimated time of the measurement operation of the first SIM 120_1 in operation S250, the searcher scheduler 116 may output the wait signal Wt to the first SIM 120_1 in operation S260. Then, when the second SIM 120_2 completes the resynchronization operation, the searcher scheduler 116 may receive the release signal R1s that represents that the second SIM 120_2 has released the BS searcher 114 in operation S270. The searcher scheduler 116 may output the start signal Stt to the first SIM 120_1 in response to the release signal R1s in operation S280 and the first SIM 120_1 may perform the measurement operation in response to the start signal Stt.

When the resynchronization operation of the second SIM 120_2 is not performed within the estimated time of the measurement operation of the first SIM 120_1 in operation S250, because the measurement operation of the first SIM 120_1 may be completed before the resynchronization operation of the second SIM 120_2 is performed, the searcher scheduler 116 may output the grant signal Grt to the first SIM 120_1 in operation S290. The first SIM 120_1 may perform the measurement operation in response to the grant signal Grt.

The resynchronization operation is to be completed before paging from the base stations (10 and 20 in FIG. 1). Because the measurement operation has no time constraints, a priority of the resynchronization operation may be higher than a priority of the measurement operation. The searcher scheduler 116 according to an example embodiment determines whether the measurement operation may be completed before the resynchronization operation is performed. When the measurement operation may not be completed before the resynchronization operation, the measurement operation is performed after resynchronization operation is completed and accordingly, the resynchronization operation and the measurement operation may be smoothly performed by one BS searcher 114.

In FIGS. 3 and 4, an example in which the searcher scheduler 116 receives the measurement grant request Req_m from the first SIM 120_1 is illustrated. Example embodiments also include an example in which the searcher scheduler 116 receives the measurement grant request Req_m from the second SIM 120_2.

Figure 5:
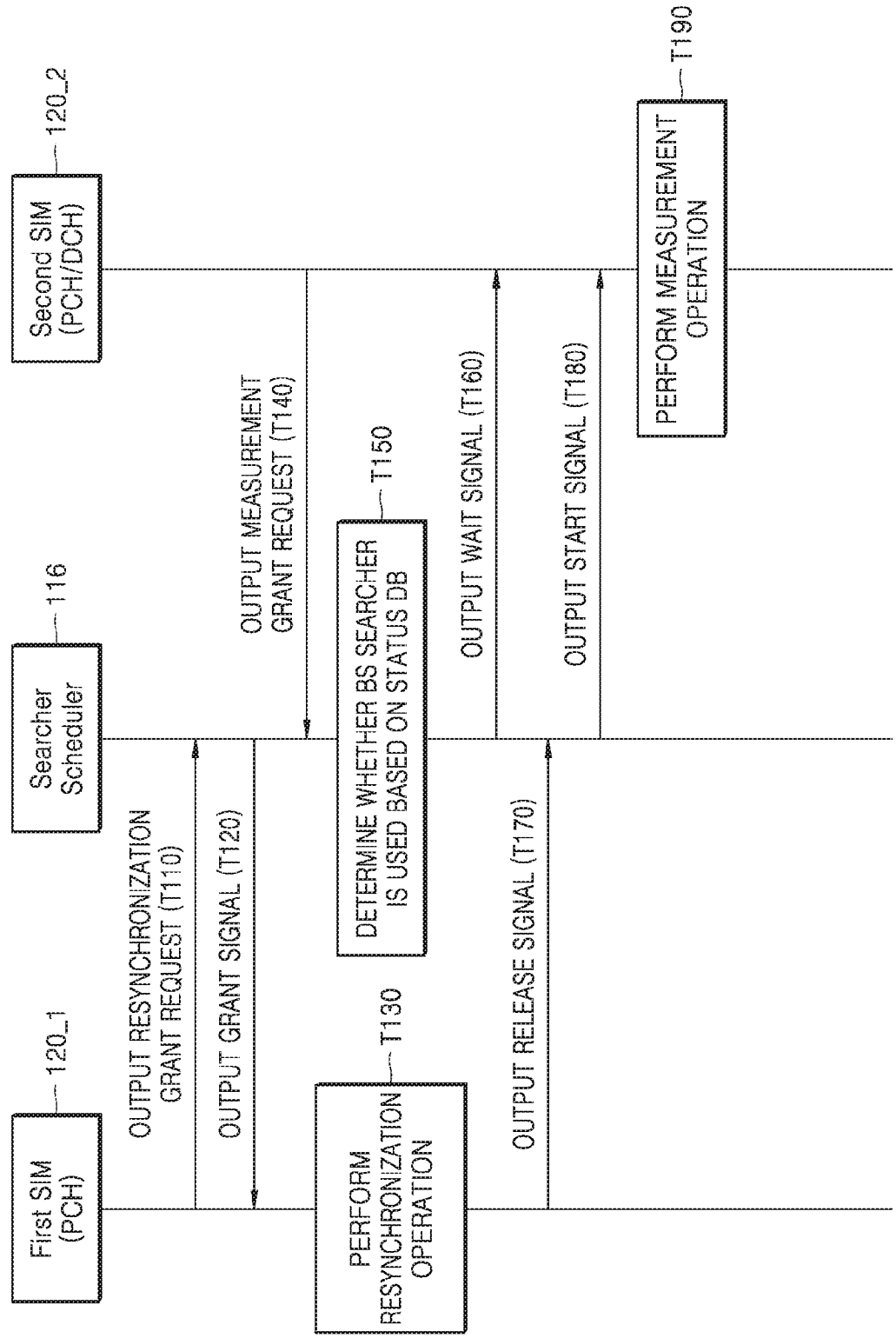
FIG. 5 is a view illustrating an operation of a multi-SIM device according to an example embodiment.

FIG. 5 is a view illustrating an operation of a multi-SIM device according to an example embodiment. In detail, FIG. 5 illustrates an example in which the second SIM 120_2 outputs the measurement grant request for the measurement operation while the first SIM 120_1 performs the resynchronization operation.

Referring to FIGS. 2 and 5, the first SIM 120_1 may be in the first status (connected to, for example, the PCH), and the second SIM 120_2 may be in the first status (connected to, for example, the PCH) or the second status (connected to, for example, the DCH). The first SIM 120_1 may output the resynchronization grant request Req_r to the searcher scheduler 116 in order to perform the resynchronization operation on the searcher scheduler 116 in operation T110. In response to the resynchronization grant request Req_r, the searcher scheduler 116 may output the grant signal Grt to the first SIM 120_1 in operation T120 and the first SIM 120_1 may perform the resynchronization operation by using the BS searcher 114 in operation T130.

The second SIM 120_2 may output the measurement grant request Req_m to the searcher scheduler 116 in order to perform the measurement operation in operation T140 and the searcher scheduler 116 may determine whether the BS searcher 114 is used based on the status database DB_st in operation T150. Because the BS searcher 114 is being used by the first SIM 120_1 to perform the resynchronization operation, the searcher scheduler 116 may output the wait signal Wt to the second SIM 120_2 in operation T160.

After the resynchronization operation is completed, the first SIM 120_1 may output the release signal R1s to the searcher scheduler 116 in operation T170. Based on the release signal R1s that is received from the first SIM 120_1, the searcher scheduler 116 may output the start signal Stt to the second SIM 120_2 in operation T180. The second SIM 120_2 may perform the measurement operation in response to the start signal Stt in operation T190.

Figure 6:
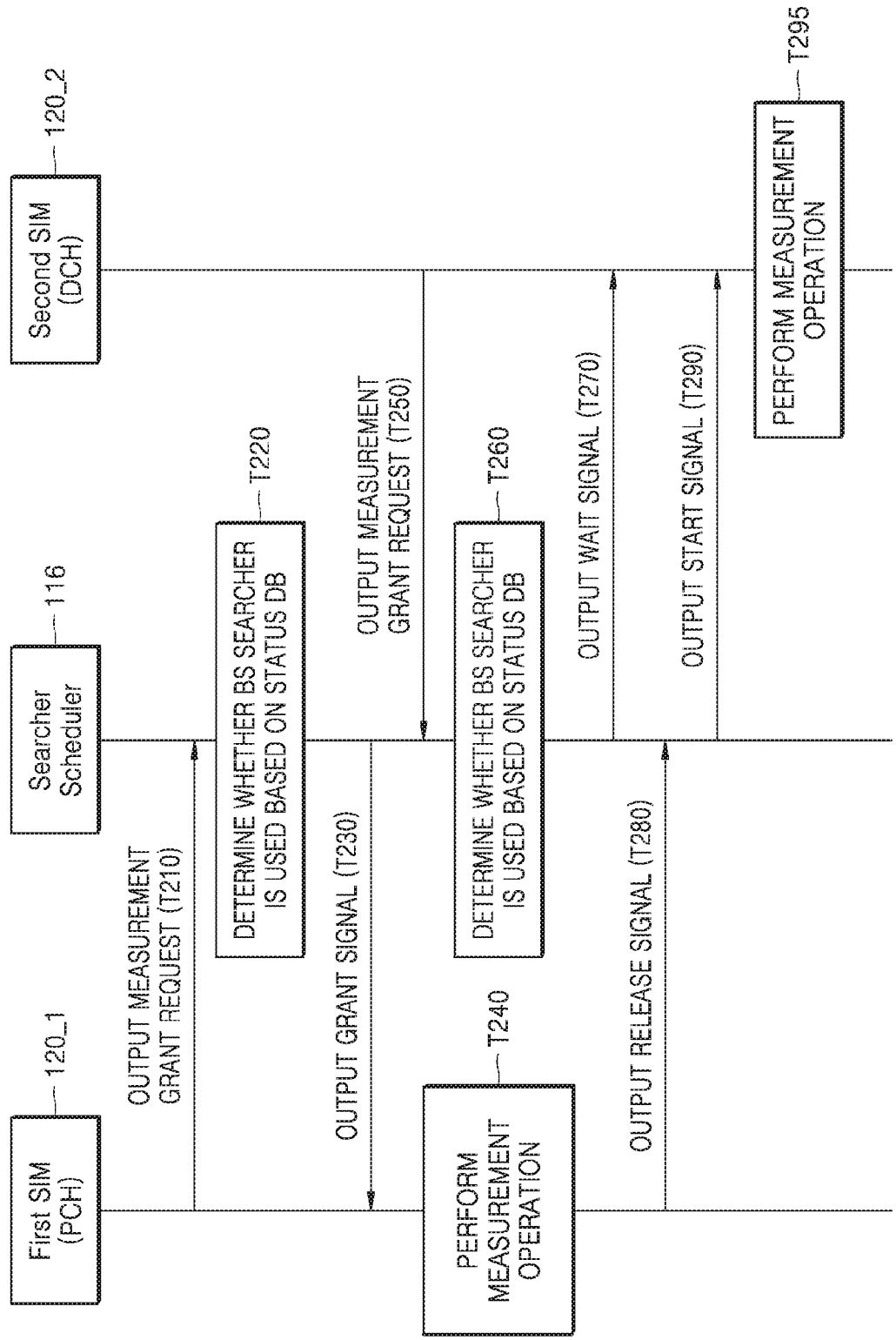
FIG. 6 is a view illustrating an operation of a multi-SIM device according to an example embodiment.

FIG. 6 is a view illustrating an operation of a multi-SIM device according to an example embodiment. In detail, FIG. 6 illustrates an example in which the second SIM 120_2 outputs the measurement grant request for the measurement operation while the measurement operation of the first SIM 120_1 is performed.

Referring to FIGS. 2 and 6, the first SIM 120_1 may be in the first status (connected to, for example, the PCH) and the second SIM 120_2 may be in the second status (connected to, for example, the DCH). The first SIM 120_1 may output the measurement grant request Req_m to the searcher scheduler 116 in order to perform the measurement operation on the searcher scheduler 116 in operation T210. In response to the measurement grant request Req_m, the searcher scheduler 116 may determine whether the BS searcher 114 is used based on the status database DB_st in operation T220. Because the BS searcher 114 is not being used by the second SIM 120_2 in the second mode, the grant signal Grt may be output to the first SIM 120_1 in operation T230 and the first SIM 120_1 may perform the measurement operation by using the BS searcher 114 in operation T240.

The second SIM 120_2 may output the measurement grant request Req_m to the searcher scheduler 116 in order to perform the measurement operation in operation T250 and the searcher scheduler 116 may determine whether the BS searcher 114 is used based on the status database DB_st in operation T260. Because the first SIM 120_1 performs the measurement operation by using the BS searcher 114, the searcher scheduler 116 may output the wait signal Wt to the second SIM 120_2 in operation T270.

The first SIM 120_1 may output the release signal R1s to the searcher scheduler 116 after the measurement operation is completed in operation T280, and based on the release signal R1s that is received from the first SIM 120_1, the searcher scheduler 116 may output the start signal Stt to the second SIM 120_2 in operation T290. The second SIM 120_2 may perform the measurement operation in response to the start signal Stt in operation T295.

Figure 7:
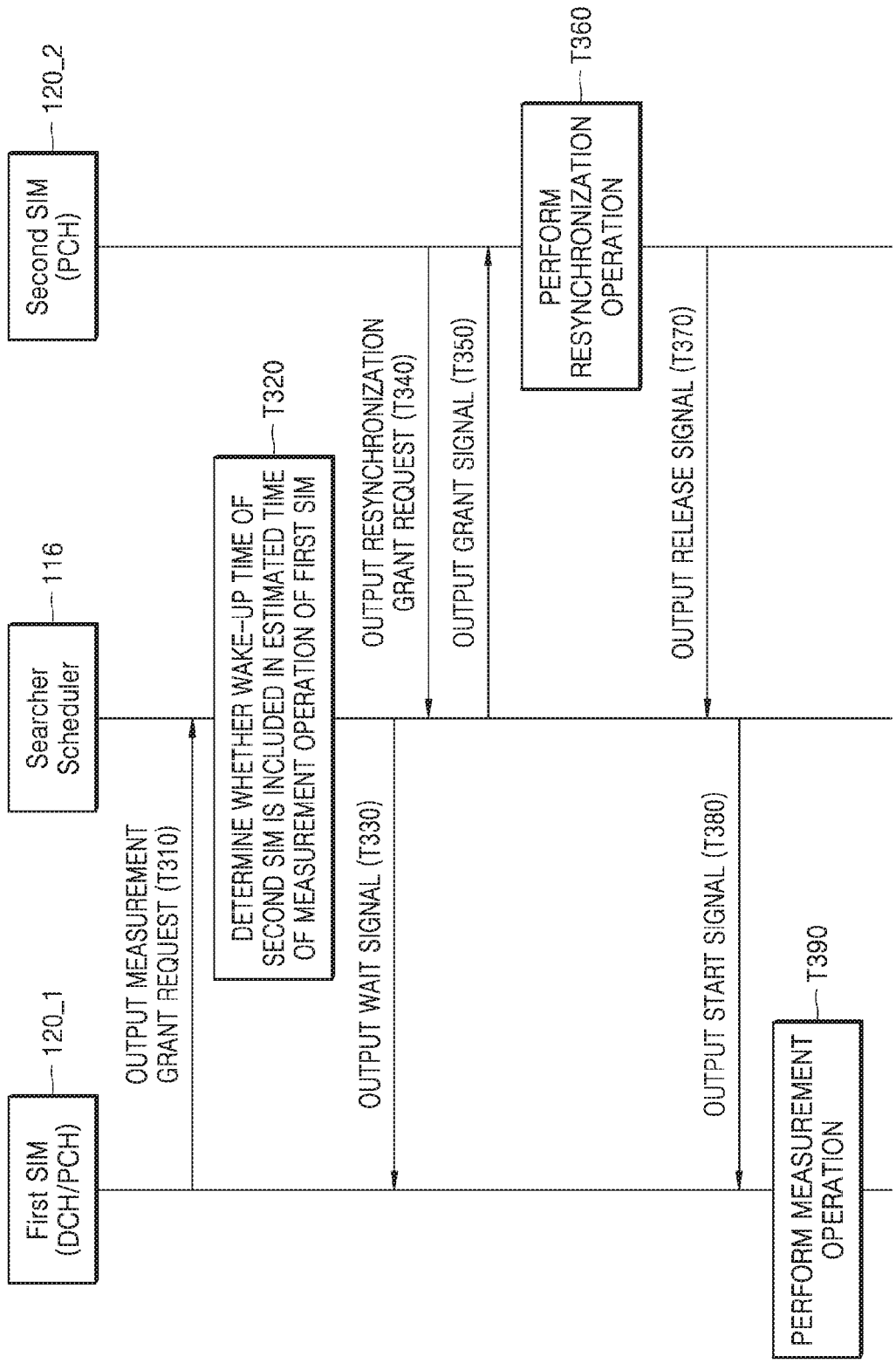
FIG. 7 is a view illustrating an operation of a multi-SIM device according to an example embodiment.

FIG. 7 is a view illustrating an operation of a multi-SIM device according to an example embodiment. In detail, FIG. 7 illustrates an example in which the second SIM 120_2 outputs the resynchronization grant request for the resynchronization operation while the measurement operation of the first SIM 120_1 is performed.

Referring to FIGS. 2 and 7, the first SIM 120_1 may be in the first status (connected to, for example, the PCH) or the second status (connected to, for example, the DCH) and the second SIM 120_2 may be in the first status (connected to, for example, the PCH). The first SIM 120_1 may output the measurement grant request Req_m to the searcher scheduler 116 in order to perform the measurement operation in operation T310. Because the second SIM 120_2 has the first status, the searcher scheduler 116 receives the wake-up time of the second SIM 120_2 (for example, from the wake-up manager 118) and may determine whether the wake-up time of the second SIM 120_2 is included in the estimated time of the measurement operation of the first SIM 120_1 in operation T320.

If the searcher scheduler 116 identifies the wake-up time T_wu of the second SIM 120_2 as being within the estimated time of the measurement operation of the first SIM 120_1, the searcher scheduler 116 may output the wait signal Wt to the first SIM 120_1 in operation T330. Then, at the prescribed wake-up time T_wu of the second SIM 120_2, the second SIM 120_2 may output the resynchronization grant request Req_r to the searcher scheduler 116 in operation T340. The searcher scheduler 116 may output the grant signal Grt to the second SIM 120_2 in response to the resynchronization grant request Req_r in operation T350, and the second SIM 120_2 may perform the resynchronization operation by using the BS searcher 114 in operation T360.

The second SIM 120_2 may output the release signal R1s to the searcher scheduler 116 after the resynchronization operation is completed in operation T370, and the searcher scheduler 116 may output the start signal Stt to the first SIM 120_1 in operation T380 based on the release signal R1s being received from the second SIM 120_2. The first SIM 120_1 may perform the measurement operation in response to the start signal Stt in operation T390.

Figure 8:
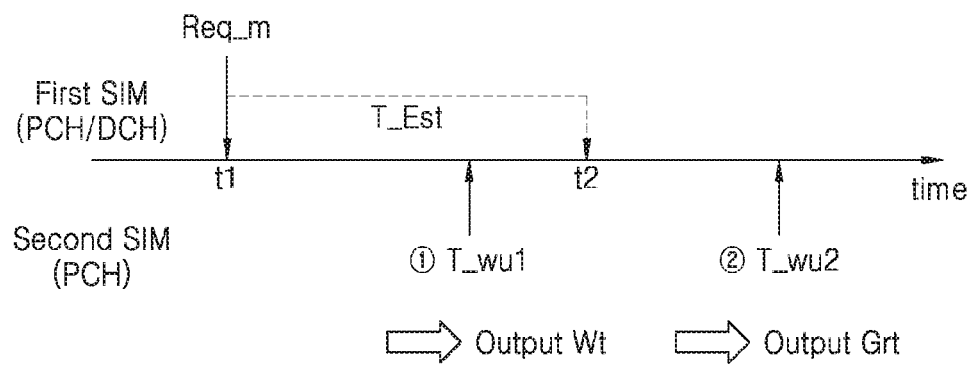
FIG. 8 is a view illustrating an operation of a searcher scheduler according to an example embodiment.

FIG. 8 is a view illustrating an operation of a searcher scheduler according to an example embodiment. In detail, FIG. 8 illustrates an example in which the second SIM 120_2 receives the resynchronization grant request for the resynchronization operation while the searcher scheduler 116 performs the measurement operation of the first SIM 120_1.

Referring to FIGS. 2 and 8, the first SIM 120_1 has the first status (connected to, for example, the PCH) or the second status (connected to, for example, the DCH) and the second SIM 120_2 may be in the first status (connected to, for example, the PCH). The searcher scheduler 116 may receive the measurement grant request Req_m from the first SIM 120_1 at a first point in time t1. Because the second SIM 120_2 has the first status (connected to, for example, the PCH), the searcher scheduler 116 receives the wake-up time of the second SIM 120_2 and may determine whether the wake-up time T_wt of the second SIM 120_2 is included in a prescribed estimated time T_Est of the measurement operation of the first SIM 120_1. In the current example, the prescribed estimated time T_Est of the measurement operation may be from the first point in time t1 to a second point in time t2.

In the example of ①, the first wake-up time T_wu1 of the second SIM 120_2 may be between the first point in time t1 and the second point in time t2. Therefore, the searcher scheduler 116 may output the wait signal Wt to the first SIM 120_1. Then, at the prescribed first wake-up time T_wu1, the second SIM 120_2 may perform the resynchronization operation by using the BS searcher 114 and, after the second SIM 120_2 completes the resynchronization operation, the first SIM 120_1 may perform the measurement operation.

In the example of ②, the second wake-up time T_wu2 of the second SIM 120_2 may not be included in a time period from the first point in time t1 to the second point in time t2. Therefore, the searcher scheduler 116 may output the grant signal Grt to the first SIM 120_1. The first SIM 120_1 may perform the measurement operation by using the BS searcher 114 in response to the grant signal Grt. Then, at the second wake-up time T_wu2 at which the measurement operation is completed, the second SIM 120_2 may perform the resynchronization operation by using the BS searcher 114.

Figure 9:
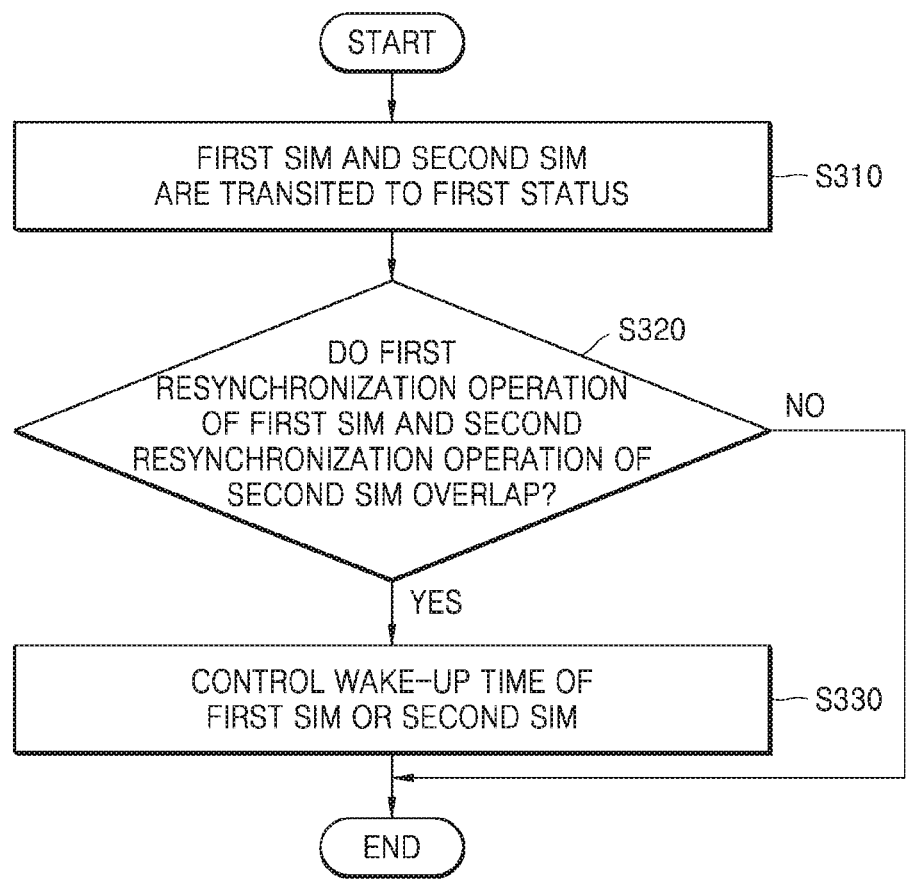
FIG. 9 is a flowchart illustrating an operation of a wake-up manager according to an example embodiment.

FIG. 9 is a flowchart illustrating an operation of a wake-up manager according to an example embodiment.

Referring to FIGS. 2 and 9, when the first SIM 120_1 and the second SIM 120_2 are transited to the first status (connected to, for example, the PCH) in operation S310, the wake-up manager 118 may determine whether a first resynchronization operation of the first SIM 120_1 and a second resynchronization operation of the second SIM 120_2 temporally overlap in operation S310. When the first resynchronization operation and the second resynchronization operation temporally overlap, the wake-up manager 118 may control the wake-up time T_wu of the first SIM 120_1 or the second SIM 120_2 in operation S330. In an example embodiment, when power is applied to the first SIM 120_1 and the second SIM 120_2, the first SIM 120_1 and the second SIM 120_2 may be transited to the first status.

According to an example embodiment, when the first resynchronization operation and the second resynchronization operation temporally overlap, the wake-up manager 118 advances the wake-up time of the first SIM 120_1 or the second SIM 120_2 and accordingly, the first resynchronization operation of the first SIM 120_1 and the second resynchronization operation of the second SIM 120_2 may not overlap and the plurality of SIMs, that is, the first SIM 120_1 and the second SIM 120_2, may perform the resynchronization operation by using one BS searcher 114.

Figure 10A:
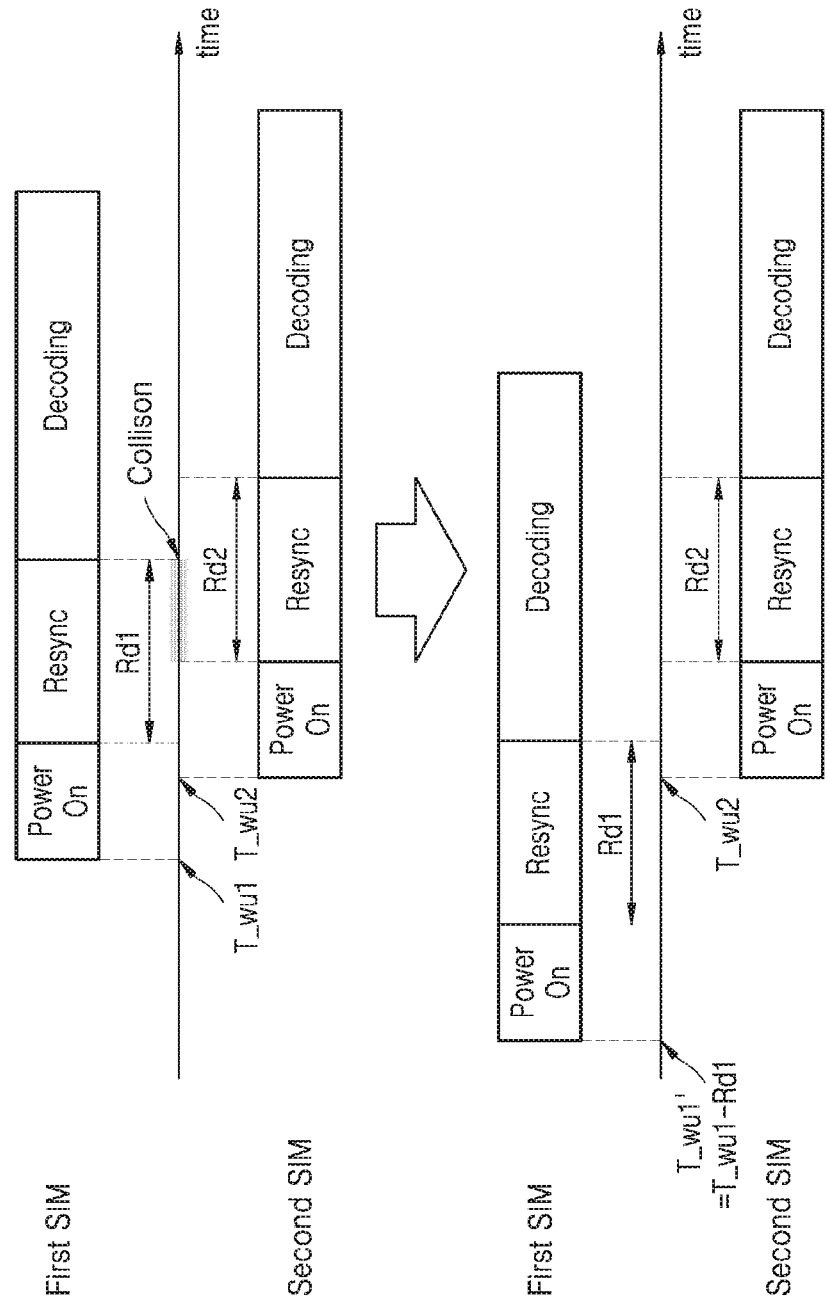
FIGS. 10A, 10B and 10C are views illustrating an operation of a wake-up manager according to an example embodiment.
Figure 10B:
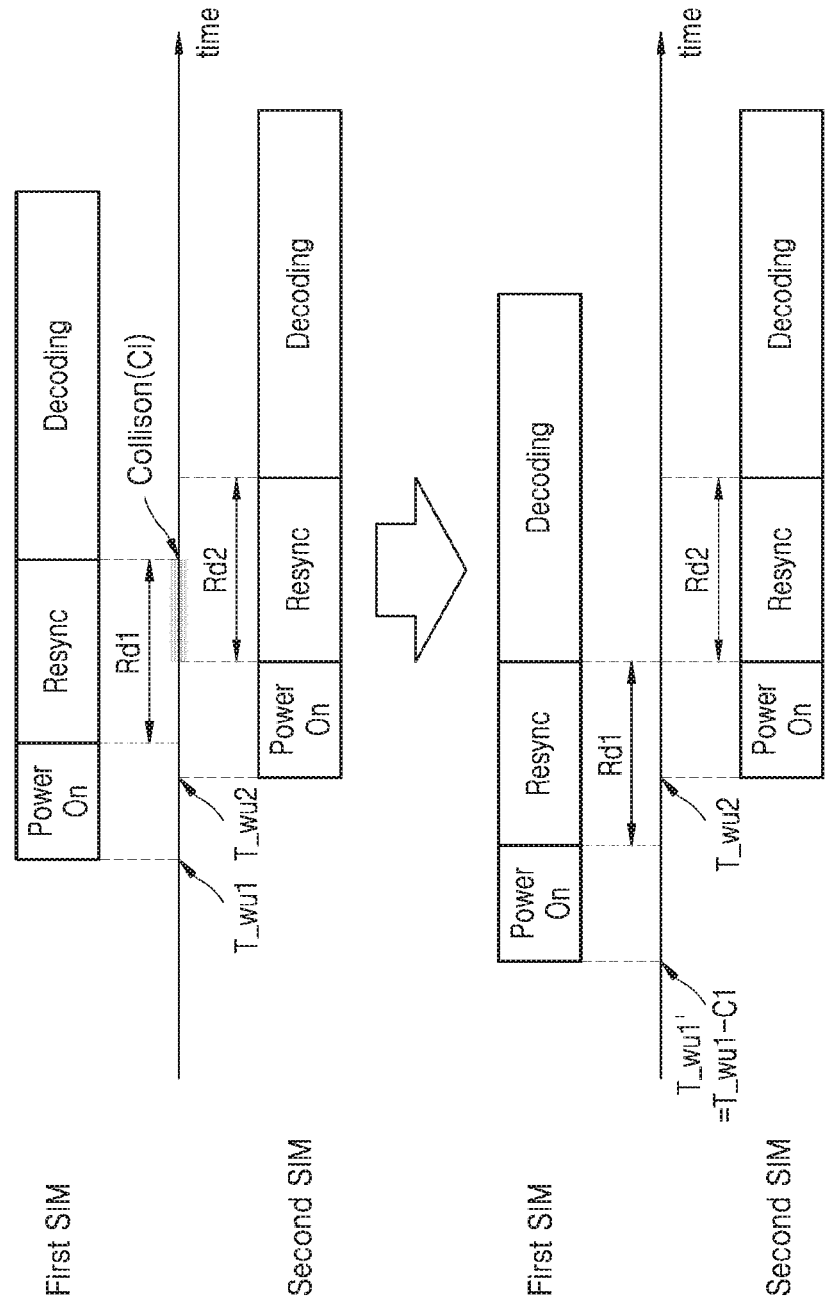
Figure 10C:
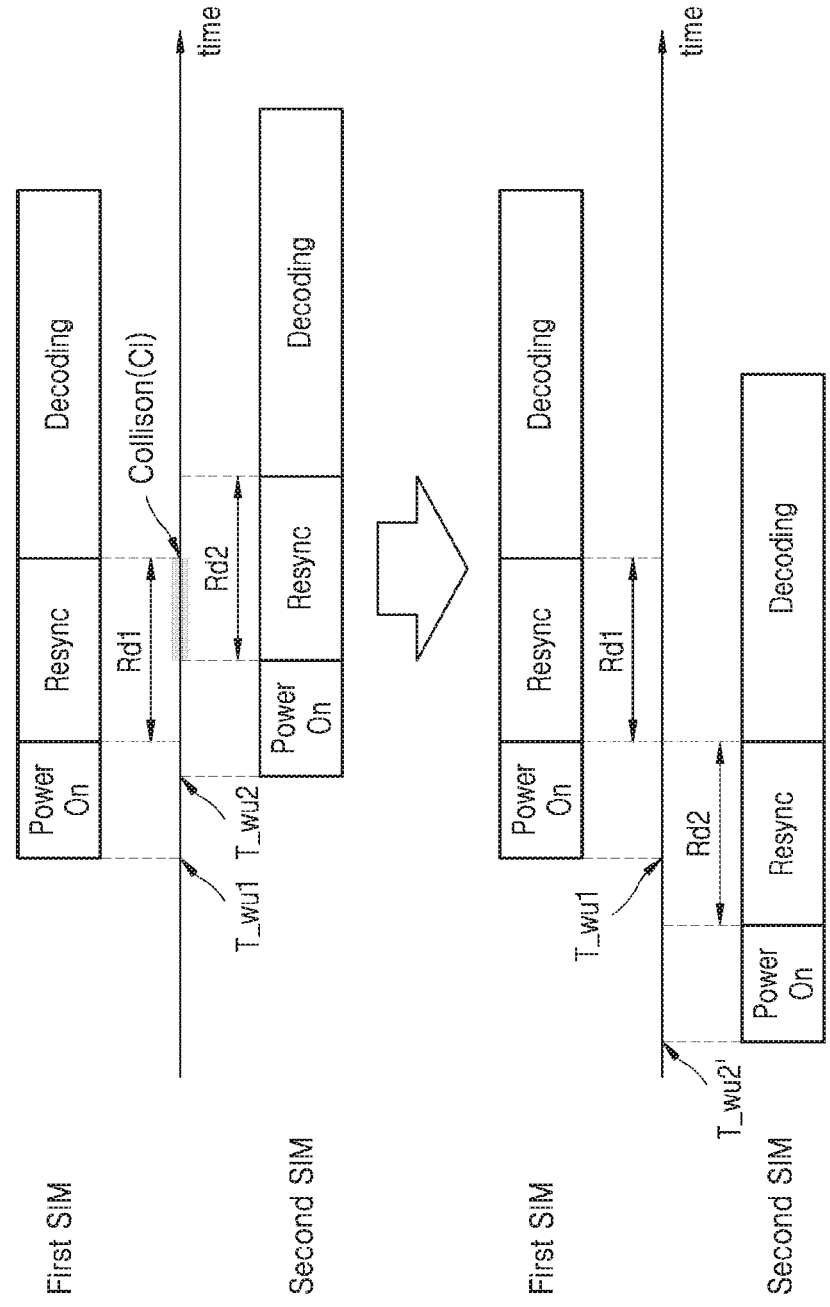

FIGS. 10A, 10B and 10C are views illustrating an operation of a wake-up manager according to an example embodiment.

Referring to FIGS. 2 and 10A, power is applied to the first SIM 120_1 at the first wake-up time T_wu1 and the first SIM 120_1 may perform the first resynchronization operation for the first time Rd1. Power is applied to the second SIM 120_2 at the second wake-up time T_wu2 and the second SIM 120_2 may perform the second resynchronization operation for the second time Rd2. Because there is a collision period in which the first time Rd1 and the second time Rd2 overlap, the wake-up manager 118 may determine a time obtained by advancing the first wake-up time T_wu1 of the first SIM 120_1 by the first time Rd1 as a new first wake-up time T_wu1'=T_wu1−Rd1.

Referring to FIGS. 2 and 10B, the collision in which the first time Rd1 and the second time Rd2 overlap may be maintained for a third time C1 and the wake-up manager 118 may determine a time obtained by advancing the first wake-up time T_wu1 of the first SIM 120_1 by the third time C1 as a new first wake-up time T_wu1'=T_wu1−C1.

Referring to FIGS. 2 and 10C, the wake-up manager 118 may change the second wake-up time T_wu2 of the second SIM 120_2 to a new second wake-up time T_wu2' obtained by advancing the second wake-up time T_wu2 and accordingly, the first time Rd1 and the second time Rd2 do not overlap.

By controlling the first wake-up time T_wu1 or the second wake-up time T_wu2 by the above-described method, the first time Rd1 required for the first resynchronization operation and the second time Rd2 required for the second resynchronization operation may not overlap and both the first SIM 120_1 and the second SIM 120_2 may perform the resynchronization operation by using the BS searcher 114.

Example embodiments may be applied to a method of controlling the wake-up time and accordingly, times required for the resynchronization operations of the plurality of SIMs, that is, the first SIM 120_1 and the second SIM 120_2, may not overlap as well as the method described in detail in FIGS. 10A, 10B and 10C.

Figure 11:
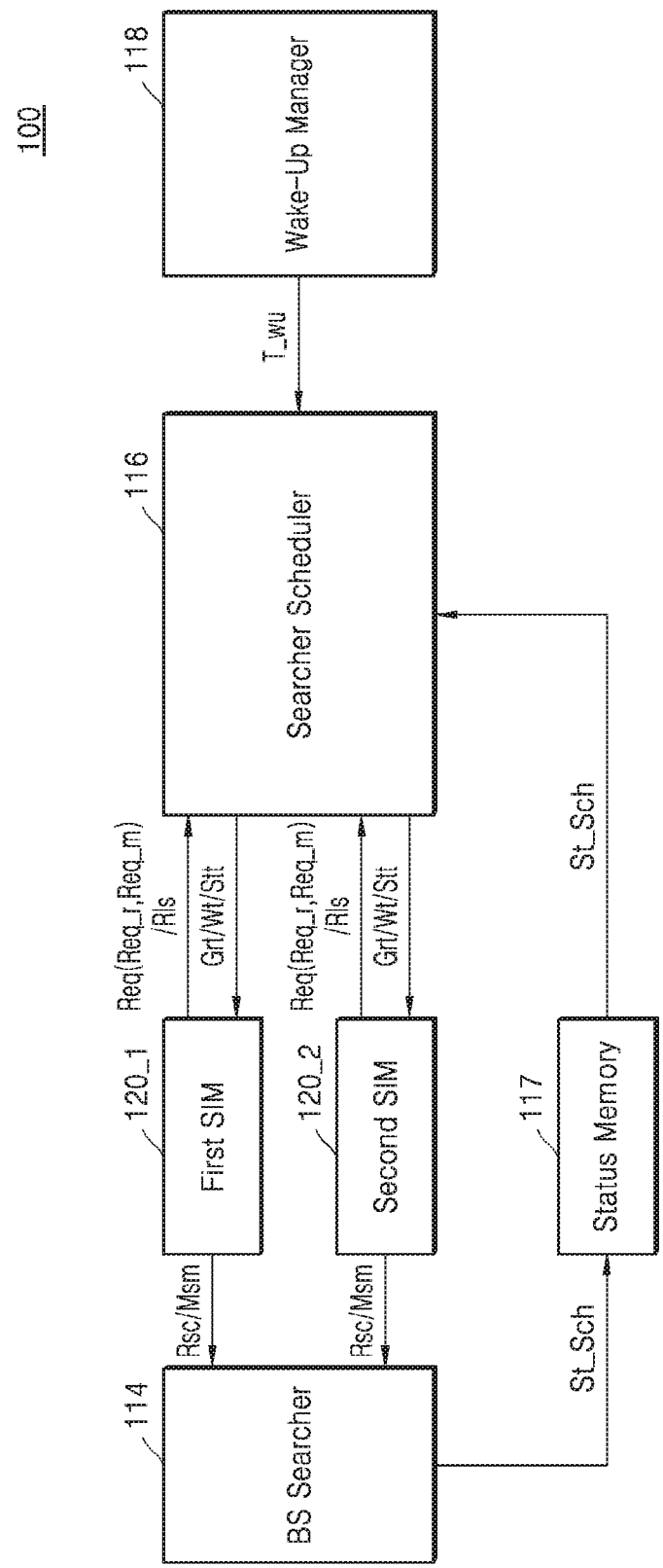
FIG. 11 is a block diagram illustrating a multi-SIM device according to an example embodiment.

FIG. 11 is a block diagram illustrating a multi-SIM device according to an example embodiment. Descriptions already given with reference to FIG. 2 are omitted.

Referring to FIG. 11, the multi-SIM device 100 may include the first SIM 120_1, the second SIM 120_2, the BS searcher 114, the searcher scheduler 116, a status memory 117, and the wake-up manager 118.

The BS searcher 114 may store status information St_Sch in the status memory 117. The status information St_Sch may include information on whether the BS searcher 114 is used by the first SIM 120_1 or the second SIM 120_2. The searcher scheduler 116 reads the status information St_Sch from the status memory 117 based on the measurement grant request Req_m of the first SIM 120_1 and the second SIM 120_2 and may determine whether the measurement operation for the first SIM 120_1 and the second SIM 120_2 is granted based on the status information St_Sch.

Figure 12:
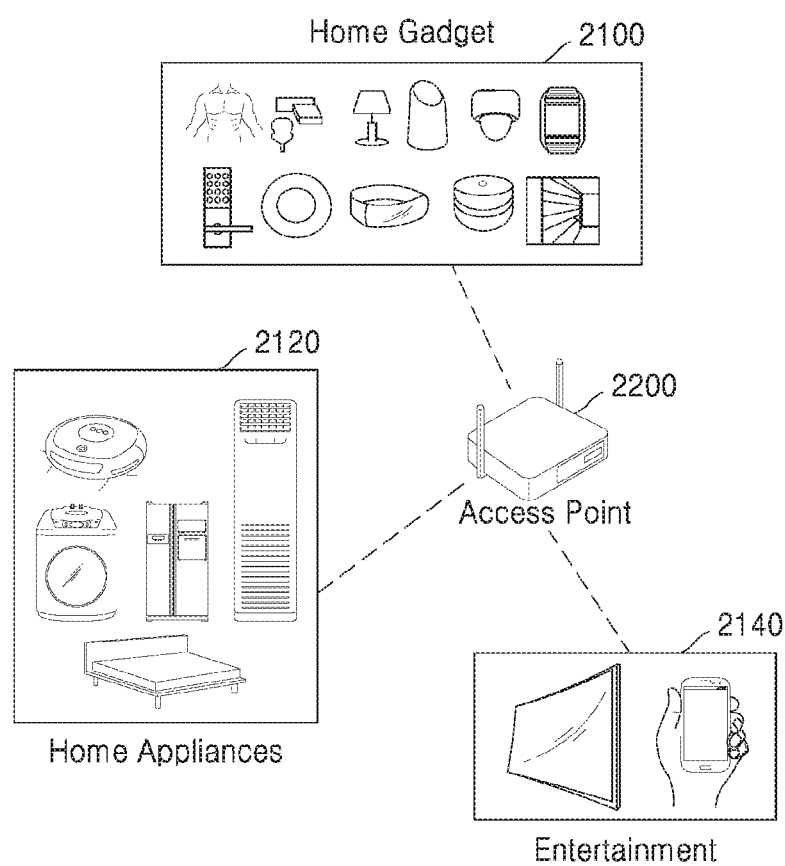
FIG. 12 is a view illustrating communication devices including a wireless communication device according to an example embodiment.

FIG. 12 is a view illustrating communication devices including a wireless communication device according to an example embodiment.

Referring to FIG. 12, a home gadget 2100, home appliances 2120, an entertainment device 2140, and an access point (AP) 2200 may include multi-SIM devices according to example embodiments. In some example embodiments, the home gadget 2100, the home appliances 2120, the entertainment device 2140, and the AP 2200 may form an Internet of Things (IoT) network system. The communication devices illustrated in FIG. 12 are only exemplary. The wireless communication device according to an example embodiment may be included in each of other communication devices that are not illustrated in FIG. 12.

The home gadget 2100, the home appliances 2120, the entertainment device 2140, and the AP 2200 may transmit and receive a signal by the above-described multi-SIM devices according to example embodiments. In an example embodiment, the home gadget 2100, the home appliances 2120, the entertainment device 2140, and the AP 2200 may include searcher scheduling for performing operation scheduling on the BS searcher. Therefore, the home gadget 2100, the home appliances 2120, the entertainment device 2140, and the AP 2200 may efficiently perform the resynchronization operations and the measurement operations on the plurality of SIMs by using one BS searcher.

At least one of the components, elements, modules or units represented by a block as illustrated in FIGS. 1, 2 and 11 may be embodied as various numbers of hardware, software and/or firmware structures that execute respective functions described above, according to an exemplary embodiment. For example, at least one of the baseband processor 110, first RF resource 112_1, second RF resource 112_2, BS searcher 114, searcher scheduler 116, status memory 117, wake-up manager 118 and other components, elements, modules or units may use a direct circuit structure, such as a memory, a processor, a logic circuit, a look-up table, etc. that may execute the respective functions through controls of one or more microprocessors or other control apparatuses. Also, at least one of the baseband processor 110, first RF resource 112_1, second RF resource 112_2, the BS searcher 114, searcher scheduler 116, status memory 117, wake-up manager 118 and other components, elements, modules or units may be specifically embodied by a module, a program, or a part of code, which contains one or more executable instructions for performing specified logic functions, and executed by one or more microprocessors or other control apparatuses. Also, at least one of the baseband processor 110, first RF resource 112_1, second RF resource 112_2, the BS searcher 114, searcher scheduler 116, status memory 117, wake-up manager 118 and other components, elements, modules or units may further include or may be implemented by a processor such as a central processing unit (CPU) that performs the respective functions, a microprocessor, or the like. Two or more of the baseband processor 110, first RF resource 112_1, second RF resource 112_2, the BS searcher 114, searcher scheduler 116, status memory 117, wake-up manager 118 and other components, elements, modules or units may be combined into one single component, element, module or unit which performs all operations or functions of the combined two or more components, elements, modules or units. Also, at least one of the baseband processor 110, first RF resource 112_1, second RF resource 112_2, the BS searcher 114, searcher scheduler 116, status memory 117, wake-up manager 118 and other components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the baseband processor 110, first RF resource 112_1, second RF resource 112_2, the BS searcher 114, searcher scheduler 116, status memory 117, wake-up manager 118 and other components, elements, modules or units represented by a block or processing steps may employ any number of related art techniques for electronics configuration, signal processing and/or control, data processing and the like.

While example embodiments have been particularly illustrated and described above, it will be apparent to those skilled in the art that various changes and modifications in form and details could be made without departing from the spirit and scope of the present disclosure.

What is claimed is:

1. A multi-subscriber identification module (SIM) device comprising:
   a first SIM interface;
   a second SIM interface; and
   at least one processor configured to implement:
      a base station (BS) searcher configured to perform a resynchronization operation for securing synchronization with a BS or a measurement operation for measuring signal quality of the BS based on a request received from the first SIM interface; and
      a searcher scheduler configured to receive the request for use of the BS searcher from the first SIM interface, and output, to the first SIM interface, one from among a start signal, a wait signal or a grant signal based on whether the first SIM interface is granted use of the BS searcher based on the request and a schedule for the BS searcher.

2. The multi-SIM device of claim 1, wherein the at least one processor is further configured to implement a wake-up manager configured to store and control a wake-up time at which the BS searcher starts the resynchronization operation in accordance with a resynchronization operation request of the first SIM interface.

3. The multi-SIM device of claim 2, wherein the BS searcher is further configured to perform a first resynchronization operation in accordance with the request received from the first SIM interface and perform a second resynchronization operation in accordance with a request received from the second SIM interface, and
wherein the wake-up manager is further configured to identify whether the first resynchronization operation and the second resynchronization operation temporally overlap based on the wake-up time and, based on it being identified that the first resynchronization operation and the second resynchronization operation temporally overlap, and modify at least one from among a first wake-up time of the first resynchronization operation and a second wake-up time of the second resynchronization operation.

4. The multi-SIM device of claim 3, wherein the wake-up manager is further configured to identify a first time spent on the first resynchronization operation and modify the first wake-up time by the first time.

5. The multi-SIM device of claim 3, wherein the wake-up manager is further configured to identify a second time at which the first resynchronization operation and the second resynchronization operation overlap and advance the first wake-up time by the second time.

6. The multi-SIM device of claim 1, wherein the searcher scheduler is further configured to access a status database indicating a status of the BS searcher and, based on a measurement grant request for the BS searcher for the measurement operation being received from the first SIM interface, identify whether the first SIM interface is granted use of the BS searcher based on the status.

7. The multi-SIM device of claim 6, wherein, the searcher scheduler is further configured to, based on the measurement grant request being received from the first SIM interface while the BS searcher performs an operation in accordance with the request from the second SIM interface, output the wait signal to the first SIM interface.

8. The multi-SIM device of claim 7, wherein the searcher scheduler is further configured to receive a release signal from the second SIM interface indicating the BS searcher has completed an operation in accordance with the request from the second SIM interface, and
wherein the searcher scheduler is further configured to output the start signal to the first SIM interface for having the first SIM interface start the measurement operation to the first SIM interface based on the release signal received from the second SIM interface.

9. The multi-SIM device of claim 6, wherein the first SIM interface and the second SIM interface are configured to operate in a first status and a second status, wherein the first status is for receiving paging from the BS and the second status is for transmitting and receiving data with the BS,
wherein the BS searcher is further configured to receive the request for the resynchronization operation and the measurement operation from the first SIM interface or the second SIM interface operating in the first status, and
wherein, in the second status, the first SIM interface or the second SIM interface outputs the BS searcher if further configured to receive the request for the measurement operation from the first SIM interface or the second SIM interface operating in the second status.

10. The multi-SIM device of claim 9, wherein the searcher scheduler is further configured to identify whether the second SIM interface has the first status or the second status when the BS searcher does not perform an operation and output the grant signal for having the first SIM interface perform the measurement operation to the first SIM interface based on the second SIM interface having the second status.

11. The multi-SIM device of claim 10, wherein the at least one processor is further configured to implement a wake-up manager configured to store and control a wake-up time at which the BS searcher starts the resynchronization operation in accordance with a resynchronization operation request of the first SIM interface or the second SIM interface,
wherein the searcher scheduler configured to receive the wake-up time of the second SIM interface from the wake-up manager when the second SIM interface has the first status and identify whether the resynchronization operation of the second SIM interface is performed within an estimated time of the measurement operation in accordance with the request of the first SIM interface based on the wake-up time of the second SIM interface.

12. The multi-SIM device of claim 11,
wherein the searcher scheduler is further configured to output the wait signal to the first SIM interface to control the first SIM interface to wait for the measurement operation based on the measurement grant request being received from the first SIM interface when the resynchronization operation of the second SIM interface is performed within the estimated time of the measurement operation,
wherein, the searcher scheduler is further configured to receive a release signal from the second SIM interface when the BS searcher completes the resynchronization operation in accordance with the request from the second SIM interface, and
wherein the searcher scheduler is further configured to output the start signal to the first SIM interface to control the first SIM interface to start the measurement operation based on the release signal being received from the second SIM interface.

13. The multi-SIM device of claim 11, wherein the searcher scheduler is further configured to output the start signal to the first SIM interface to control the first SIM interface to perform the measurement operation when the resynchronization operation of the second SIM interface is not performed within the estimated time of the measurement operation.

14. A method of scheduling an operation of a base station (BS) searcher configured to perform a resynchronization operation for securing synchronization with a BS or a measurement operation for measuring signal quality of the BS based on a request received from a first subscriber identification module (SIM) interface or a second SIM interface, the method comprising:
receiving a measurement grant request for the BS searcher from the first SIM interface; and
outputting to the first SIM interface, based on a status of the BS searcher, one from among a wait signal for having the first SIM interface wait for the measurement operation or a grant signal for having the first SIM interface perform the measurement operation.

15. The method of claim 14, further comprising:
receiving a release signal that represents that use for the BS searcher is completed from the second SIM interface; and outputting a start signal for having the first SIM interface start the measurement operation to the first SIM interface based on the release signal, and wherein the outputting of the grant signal comprises outputting the wait signal to the first SIM interface when the BS searcher performs an operation.

16. The method of claim 14, wherein the first SIM interface and the second SIM interface are configured to operate in a first status and a second status, wherein the first status is for receiving paging from the BS and the second status is for transmitting and receiving data with the BS, and wherein the outputting of the grant signal comprises:
identifying whether the second SIM interface has the first status or the second status when the BS searcher does not perform an operation; and outputting the grant signal for having the first SIM interface perform the measurement operation to the first SIM interface when the second SIM interface has the second status.

17. The method of claim 16, wherein the outputting of the grant signal comprises:

receiving a wake-up time at which the resynchronization operation of the second SIM interface starts when the second SIM interface has the first status; and identifying whether the resynchronization operation of the second SIM interface is performed within an estimated time of the measurement operation in accordance with the request of the first SIM interface based on the wake-up time of the second SIM interface.

18. The method of claim 17, wherein the outputting of the grant signal comprises:

outputting the wait signal to the first SIM interface for having the first SIM interface wait for the measurement operation when the resynchronization operation of the second SIM interface is performed within the estimated time of the measurement operation in accordance with the request of the first SIM interface;

receiving a release signal from the second SIM interface when the resynchronization operation of the second SIM interface is completed;

outputting a start signal for having the first SIM interface start the measurement operation to the first SIM interface based on the release signal; and outputting the grant signal for having the first SIM interface perform the measurement operation to the first SIM interface when the resynchronization operation of the second SIM interface is not performed within the estimated time of the measurement operation in accordance with the request of the first SIM interface.

19. A method of managing a wake-up time at which a base station (BS) searcher starts a resynchronization operation in accordance with a resynchronization operation request for securing synchronization with a first BS corresponding to a first subscriber identification module (SIM) interface and a second BS corresponding to a second SIM interface, the method comprising:

identifying whether a first resynchronization operation corresponding to the first SIM interface temporally overlaps with a second resynchronization operation corresponding to the second SIM interface; and controlling a wake-up time of the first SIM interface based on a result of the identifying whether the first resynchronization operation and the second resynchronization operation temporally overlap.

20. The method of claim 19, wherein the controlling of the wake-up time of the first SIM interface comprises advancing the wake-up time of the first SIM interface a time spent on the first resynchronization operation.

\* \* \* \* \*